(12) United States Patent
Quinn et al.

(10) Patent No.: US 11,469,919 B2
(45) Date of Patent: Oct. 11, 2022

(54) BIDIRECTIONAL COMMUNICATION CIRCUIT AND A METHOD FOR OPERATING A BIDIRECTIONAL COMMUNICATION CIRCUIT

(71) Applicant: Analog Devices International Unlimited Company, Limerick (IE)

(72) Inventors: Neil Anthony Quinn, Westmeath (IE); Conal Watterson, Raheen (IE)

(73) Assignee: Analog Devices International Unlimited Company, Limerick (IE)

(*) Notice: Subject to any disclaimer, the term of this patent is extended or adjusted under 35 U.S.C. 154(b) by 34 days.

(21) Appl. No.: 17/023,693

(22) Filed: Sep. 17, 2020

(65) Prior Publication Data

US 2022/0086020 A1    Mar. 17, 2022

(51) Int. Cl.
| | | |
|---|---|---|
| *H04L 12/40* | (2006.01) | |
| *H04L 7/00* | (2006.01) | |
| *H04L 7/04* | (2006.01) | |
| *H04L 41/22* | (2022.01) | |

(52) U.S. Cl.
CPC ...... *H04L 12/40039* (2013.01); *H04L 7/0012* (2013.01); *H04L 7/042* (2013.01); *H04L 12/40143* (2013.01); *H04L 41/22* (2013.01)

(58) Field of Classification Search
CPC . H04L 12/40039; H04L 7/0012; H04L 7/042; H04L 12/40143; H04L 41/22
See application file for complete search history.

(56) References Cited

U.S. PATENT DOCUMENTS

| | | | | |
|---|---|---|---|---|
| 5,455,912 | A  | * | 10/1995 | Ludwig ................. G06F 13/362 |
| | | | | 710/113 |
| 6,023,476 | A  | | 2/2000 | Lo |
| 6,958,627 | B2 | * | 10/2005 | Singh .................... G06F 9/3871 |
| | | | | 326/93 |
| 8,362,802 | B2 | * | 1/2013 | Nowick ................. H03K 19/21 |
| | | | | 326/54 |
| 8,990,466 | B2 | | 3/2015 | Bacigalupo |
| 9,753,486 | B2 | | 9/2017 | Stevens et al. |

(Continued)

FOREIGN PATENT DOCUMENTS

| | | |
|---|---|---|
| CN | 101800535 | 8/2010 |
| CN | 104320341 | 5/2017 |

(Continued)

OTHER PUBLICATIONS

"Add a Loss of Signal (LOS) Indicator to Your RS-485 or RS-422 Transceiver", Renesas Application Note, (Mar. 6, 2015), 4 pgs.

(Continued)

*Primary Examiner* — Freshteh N Aghdam
(74) *Attorney, Agent, or Firm* — Schwegman Lundberg & Woessner, P.A.

(57) ABSTRACT

The present disclosure relates to a bidirectional communication circuit for bidirectional communication between a first differential wired network and a second differential wired network and a related method of operating the bidirectional communication circuit. In particular, the present disclosure relates to a bidirectional communication circuit designed to prevent timing glitches and simultaneous transmission of data from the first network to the second network and from the second network to the first network.

20 Claims, 15 Drawing Sheets

(56) References Cited

U.S. PATENT DOCUMENTS

| | | | |
|---|---|---|---|
| 10,310,994 B2* | 6/2019 | Stevens | G06F 13/4282 |
| 2013/0259146 A1 | 10/2013 | Mangano et al. | |
| 2015/0227489 A1 | 8/2015 | Chen et al. | |
| 2018/0101495 A1* | 4/2018 | Mackay | G06F 1/3296 |
| 2019/0330047 A1* | 10/2019 | Joginipelly | G07F 9/026 |

FOREIGN PATENT DOCUMENTS

| | | |
|---|---|---|
| DE | 102005013328 | 9/2006 |
| EP | 1620968 | 2/2011 |
| WO | 2002058330 | 7/2002 |

OTHER PUBLICATIONS

"Isolated RS-485 Repeaters", Renesas Application Note, (Jul. 2017), 17 pgs.

"Dual Isolated Half-Duplex RS-485 Repeater", Texas Instruments Inc., (Sep. 2014), 10 pgs.

Anslow, Richard, "AN-1451 Application Note: RS-485 Fail-Safe and Loss of Signal Detector for Energy Metering Applications", Analog Devices, Inc., (Mar. 2017), 5 pgs.

Anslow, Richard, "AN-1458 Application Note: Isolated RS-485 Repeater with Automatic Direction Control", Analog Devices, Inc., (Sep. 2017), 8 pgs.

Dai, Bin, "Finite State Markov Wiretap Channel With Delayed Feedback", preprint, IEEE Transactions on Information Forensics and Security, 12(3), (2016), 15 pgs.

Jacobson, Hans, "Asynchronous Circuit Design: A Case Study of a Framework Called ACK", MS Thesis, Lulea U. of Technology, (1996), 137 pgs.

Ndjountche, Tertulien, "Asynchronous Finite State Machines", Digital Electronics 3: Finite-state Machines, John Wiley and Sons, (Oct. 2016), 213-286.

"International Application Serial No. PCT/EP2021/075131, International Search Report dated Dec. 23, 2021", 4 pgs.

"International Application Serial No. PCT/EP2021/075131, Written Opinion dated Dec. 23, 2021", 5 pgs.

* cited by examiner

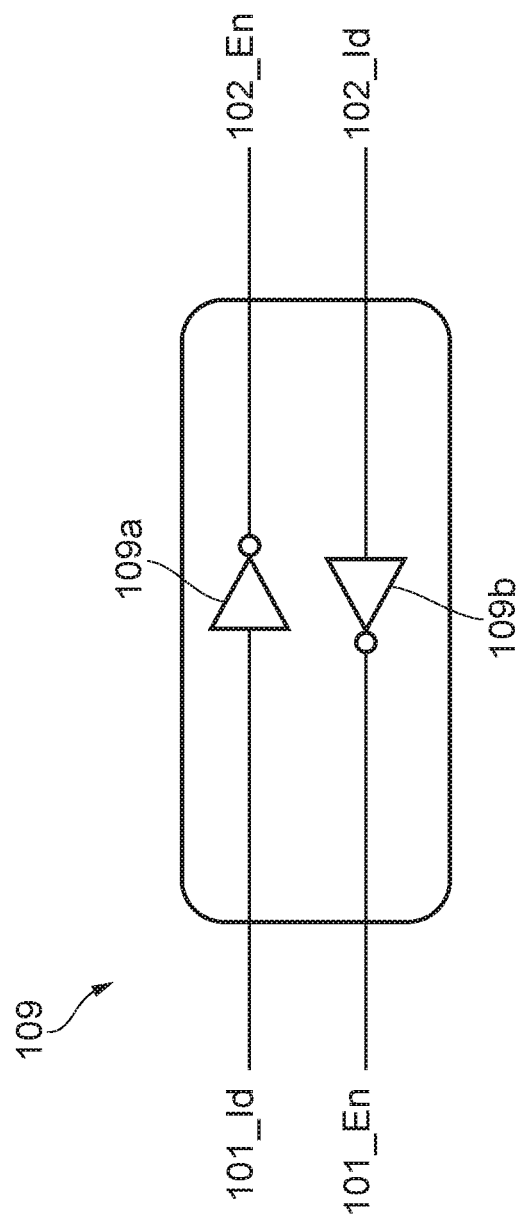

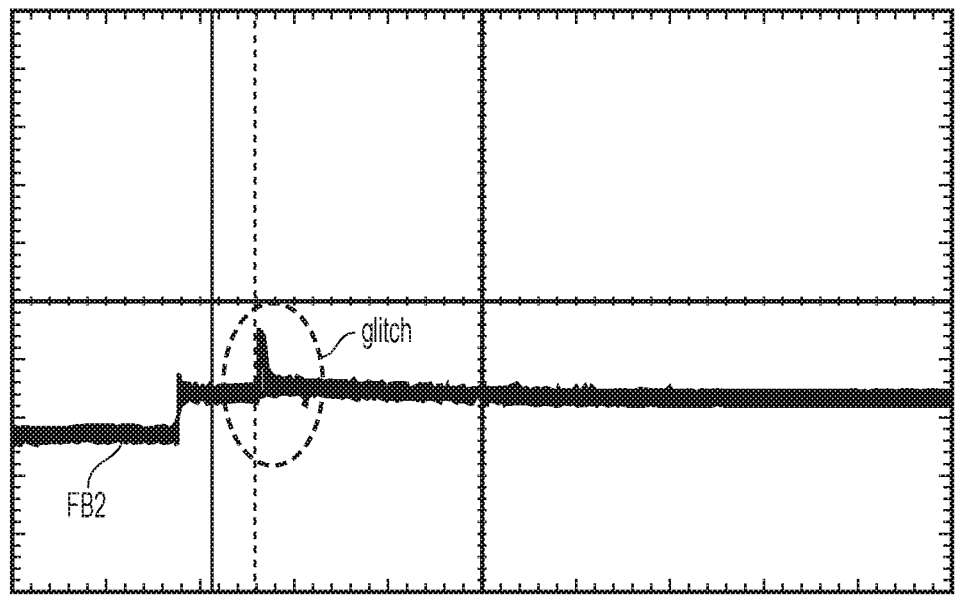
FIG. 5a(i)
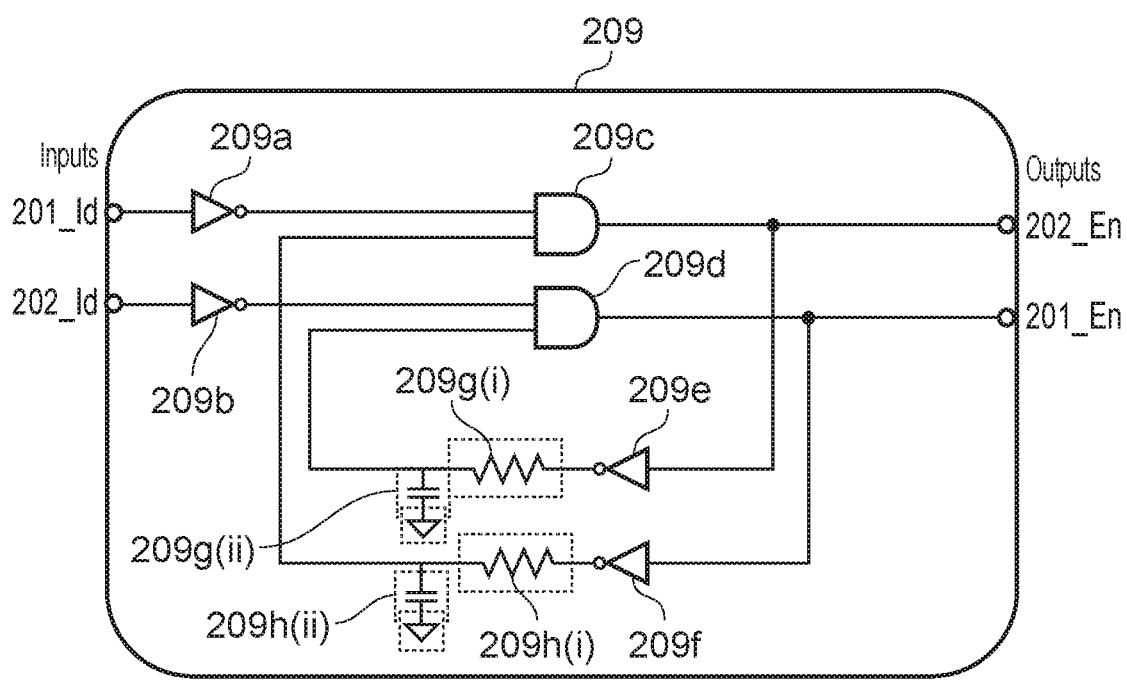
FIG. 5a(ii)

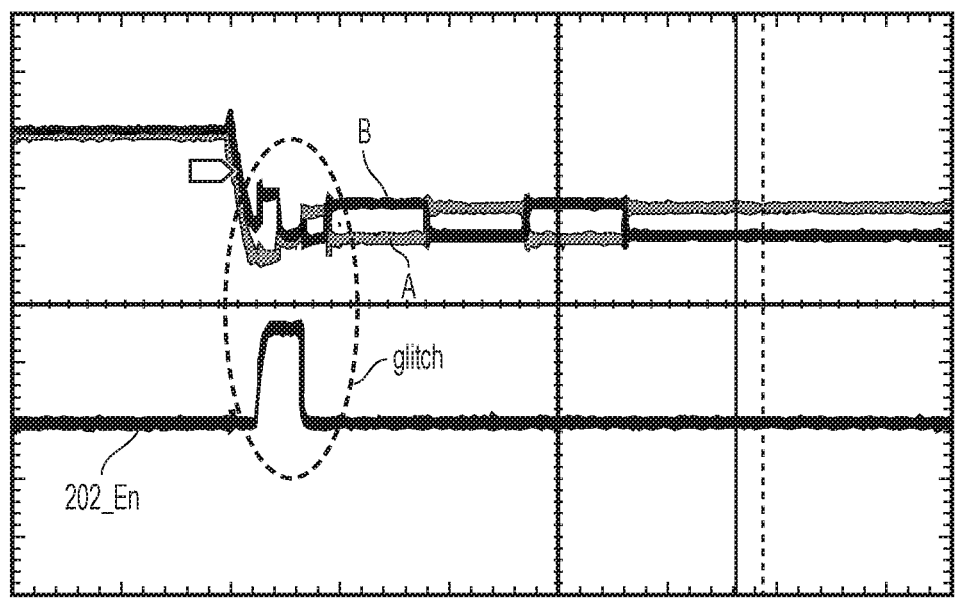
FIG. 5b(i)
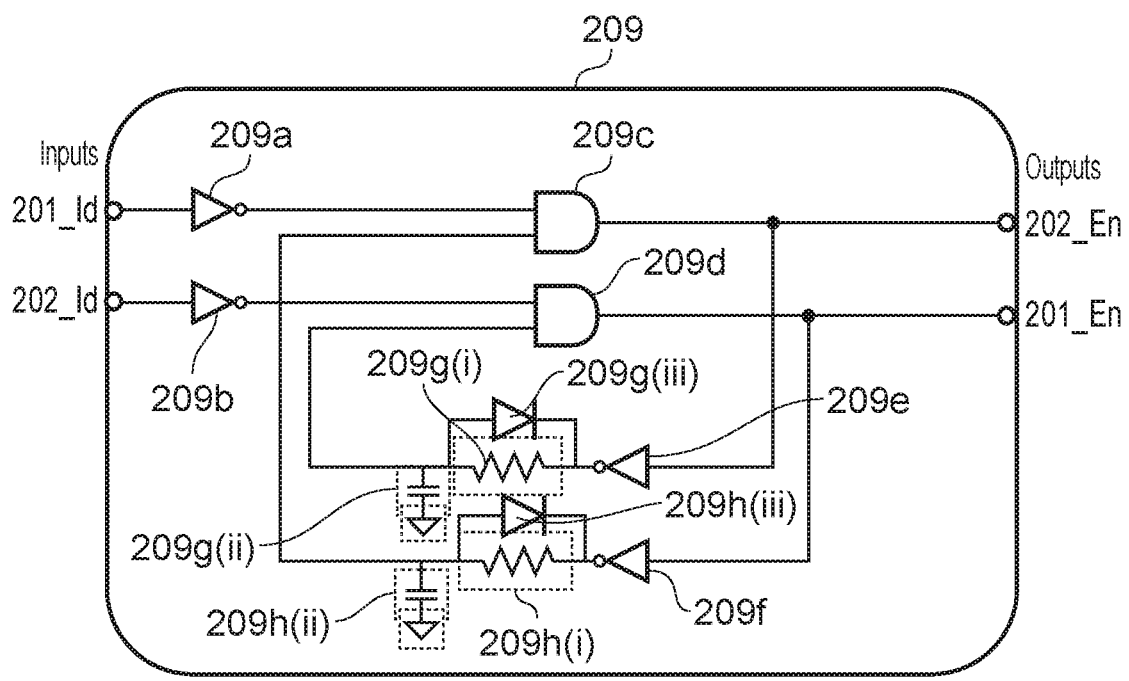
FIG. 5b(ii)

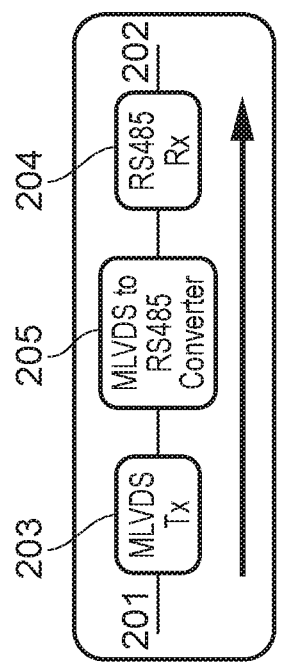
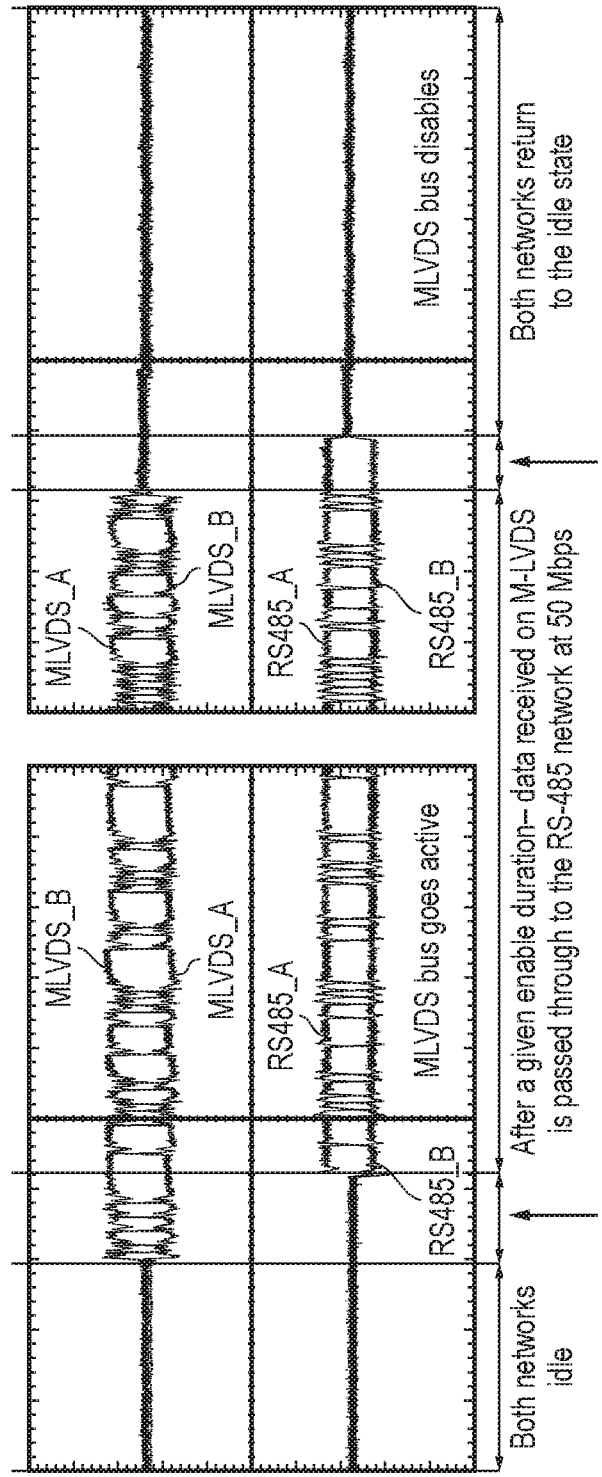

FIG. 8b(ii)

FIG. 8b(iii)

BIDIRECTIONAL COMMUNICATION CIRCUIT AND A METHOD FOR OPERATING A BIDIRECTIONAL COMMUNICATION CIRCUIT

FIELD OF DISCLOSURE

The present disclosure relates to a bidirectional communication circuit for bidirectional communication between a first differential wired network and a second differential wired network and a related method of operating the bidirectional communication circuit. In particular, the present disclosure relates to a bidirectional communication circuit designed to prevent timing glitches and simultaneous transmission of data from the first network to the second network and from the second network to the first network.

BACKGROUND

Differential wired data transmission is implemented in several industrial and instrumentation applications. A key benefit of differential wired communication is that it enables bidirectional communication over a single pair of twisted cables. Furthermore, differential data transmission has the advantage of improved noise immunity and enables multiple drivers and receivers to be connected on the same bus. RS-485 is an example of a commonly used differential wired communication standard. A typical application of the RS-485 standard is for data transmission between a master device and multiple devices of a system, for example data transmission between a motor driver and different units in a motor control system. Conventionally the RS-485 communication standard, with data rates of up to 50 Mbps, meets the signal requirements for most applications. However, next generation applications may implement signals with data rates higher than 50 Mbps. For this purpose it may be desirable to use a differential wired communication standard with a higher data rate such as, for example, an M-LVDS standard, for some or all of the devices in a system, in bidirectional communication with each other. For example, in a motor application, a master device or driver may be operating under the RS-485 communication standard and another device, in a bidirectional communication with the master device, such as a position encoder for monitoring a shaft position of a motor, may be required to operate under the M-LVDS communication standard due to signal requirements with respect to a higher data rate. In this case, a bidirectional communication circuit may be required for converting between the RS-485 and M-LVDS communication standards. In another example application, a bidirectional communication circuit may be required to function as a repeater between two devices operating under the same communication standard. The design of a bidirectional communication circuit, for use as a repeater or converter, needs to account for data integrity during communication between two devices or networks in bidirectional communication with each other. It may also be desirable for the design of such a circuit to be flexible and cost-effective for easy integration into hardware that is already implemented in consumer products.

SUMMARY OF DISCLOSURE

The present disclosure relates to a bidirectional communication circuit for bidirectional communication between a first differential wired network and a second differential wired network and a related method of operating the bidirectional communication circuit. In particular, the present disclosure relates to a bidirectional communication circuit designed to prevent timing glitches and simultaneous transmission of data from the first network to the second network and from the second network to the first network.

The proposed design of the bidirectional communication circuit has the advantage of being a flexible, cost-effective design for improving data integrity. The proposed design for the bidirectional communication circuit comprises a transceiver unit, an idle state detection unit configured to determine an idle state of each network and a data flow control circuit coupled to the transceiver unit and the idle state detection unit. The data flow control circuit comprises an asynchronous finite state machine (FSM). The inventors have recognised that an asynchronous FSM, that is an FSM which operates without requiring a clock, can be used with feedback together with an idle state detection unit to control the transmission of each network to prevent bus contention. In the context of this disclosure, bus contention refers to the simultaneous transmission of data from the first network to the second network and from the second network to the first network. The inventors have evaluated the practical implementation of the proposed design and further improved it to reduce timing glitches that were observed during the implementation. The inventors have also recognised that an asymmetric delay may be implemented in the feedback to the asynchronous FSM to prevent timing hazards which may occur when the bidirectional communication circuit is used for data conversion at high data rates (50 Mbps). The inventors have also recognised that a glitch filter may be coupled to the output of the idle state detection circuit to remove any unwanted glitches which may occur due to pulse skew induced by the transceiver units coupled to the input of the idle state detection circuit.

The proposed bidirectional communication circuit may be used as a repeater or a converter circuit between two differential wired networks. An additional advantage of one of the implementations of the proposed bidirectional communication circuit is that the design of the bidirectional communication circuit can be easily adapted to include galvanic digital isolation to prevent the occurrence of ground loops and further improve the noise immunity of the proposed bidirectional communication circuit.

According to a first aspect of this disclosure, there is provided a bidirectional communication circuit for bidirectional communication between a first differential wired communication network and a second differential wired communication network, the bidirectional communication circuit comprising: a transceiver unit configured to receive and transmit data to and from each network; an idle state detection unit configured to determine an idle state of each network; and a data flow control unit coupled to the transceiver unit and to the idle state detection unit, wherein the data flow control unit is configured to control a direction of communication flow between the first network and the second network, wherein the data flow control unit comprises an asynchronous finite state machine having feedback, and wherein the data flow control unit is configured to prevent data being simultaneously transmitted from the first network to the second network and from the second network to the first network.

According to a second aspect of this disclosure there is provided a bidirectional communication system comprising: a first differential wired network; a second differential wired network; and a bidirectional communication circuit according to the above-mentioned first aspect of the disclosure, wherein the first differential wired network is coupled to the second differential wired network via the said bidirectional communication circuit.

According to third aspect of this disclosure, there is provided a method for bidirectional communication between a first differential wired communication network and a second differential wired communication network, the method comprising: receiving a first signal indicative of an idle state of the first network and a second signal indicative of an idle state of the second network; receiving a first feedback signal indicative of a current transmission state of the first network and a second feedback signal indicative of a current transmission state of the second network; comparing the first signal indicative of the idle state of the first network and the first feedback signal indicative of the current transmission state of the first network; comparing the second signal indicative of the idle state of the second network and the second feedback signal indicative of the current transmission state of the second network; generating a first control signal for controlling the next transmission state of the first network based on the said comparison of the second signal indicative of the idle state of the second network and the second feedback signal indicative of the current transmission state of the second network; and generating a second control signal for controlling the next transmission state of the second network based on the said comparison of the first signal indicative of the idle state of the first network and the first feedback signal indicative of the current transmission state of the first network.

According to a further aspect of this disclosure there is provided a bidirectional communication circuit for bidirectional transmission of data in a multipoint differential wired communication system, wherein the bidirectional communication circuit is configured to prevent bus contention between networks in a bidirectional communication, in the multipoint differential wired communication system.

Further features of the disclosure are defined in the appended claims.

BRIEF DESCRIPTION OF THE DRAWINGS

The teachings of this disclosure will be discussed, by way of non-limiting examples, with reference to the accompanying drawings, in which:

FIG. 2a shows a simplified block diagram of a data flow control circuit 109;

FIG. 3c shows a circuit-level implementation of the data flow control unit 209 of FIG. 3a;

FIG. 5a(i) shows an example of a first timing issue observed, during operation of the data flow control unit 209 of FIG. 3c in a bidirectional communication system of FIG. 3b, when a high speed network is switching to an idle state from a transmission state;

FIG. 5a(ii) shows an example circuit-level schematic of the data flow control unit 209 comprising delay circuits integrated in the feedback loops of the FSM;

FIG. 5b(i) shows an example of a glitch issue which occurs, during operation of the data flow control unit 209 of FIG. 5a(ii) in a bidirectional communication system of FIG. 3b, when a high speed network is switching to a transmission state from an idle state;

FIG. 5b(ii) shows a circuit-level schematic of the data flow control unit 209 comprising asymmetric delay circuits integrated in the feedback loops of the FSM, according an embodiment of this disclosure;

DETAILED DESCRIPTION

The present disclosure provides a bidirectional communication circuit for use as a repeater or converter node between a first differential wired network in bidirectional communication with a second differential wired network. For example, the proposed bidirectional communication circuit may be used as a converter between an RS-485 network and an M-LVDS network. The present disclosure also provides a related method for operating the bidirectional communication circuit.

The proposed bidirectional communication circuit comprises an idle state detection circuit and a data flow control circuit. The bidirectional communication circuit may also comprise a transceiver unit comprising a primary transceiver for each network, where the primary transceiver for a given network is configured to receive and transmit data to and from the respective network.

The idle state detection circuit is configured for detecting an idle state of each of the networks. The data flow control circuit is coupled to the idle state detection circuit and is configured to control a direction of communication flow between the first network and the second network. That is, the data flow control unit controls the operation of the transmitters in the primary transceivers of the each network.

The proposed data flow control circuit of the bidirectional communication circuit advantageously prevents bus contention arising due to simultaneous transmission of data from the first network to the second network and from the second network to the first network. A key feature of the proposed data flow control circuit is that it operates asynchronously, that is, without requiring a clock. The proposed data flow control circuit is further configured to avoid timing glitches in the communication between the two networks.

Figure 1:
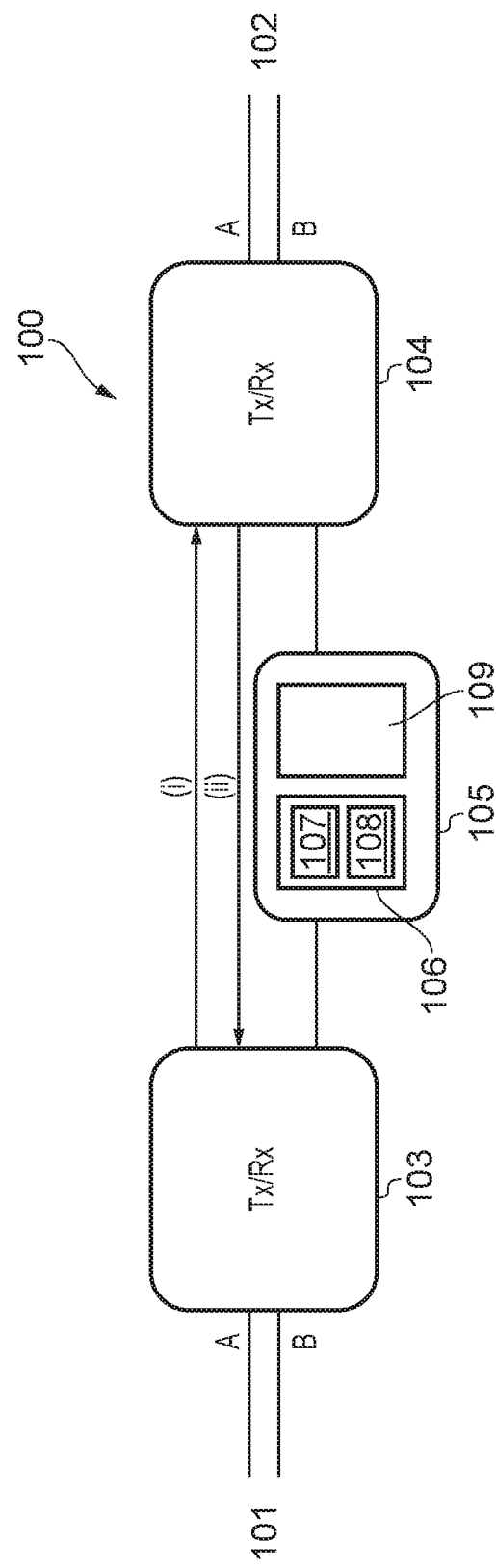
FIG. 1 is a block diagram of an example bidirectional communication system 100.

FIG. 1 is a block diagram of an example bidirectional communication system 100 comprising a first differential wired network 101 in bidirectional communication with a second differential wired network 102. Each differential wired network 101, 102 comprises a respective transceiver 103, 104. FIG. 1 also shows paths for bidirectional data flow: path (i) where data received on network 101 by transceiver 103 is passed to transceiver 104 for transmission onto network 102 and path (ii) where data received on network 102 by transceiver 104 is passed to transceiver 103 for transmission onto network 101.

The bidirectional communication system further comprises a bidirectional communication circuit 105 configured to control data flow between the two differential wired networks 101 and 102. The bidirectional communication circuit comprises idle state detection circuit 106 and data flow control circuit 109.

For ease of representation, FIG. 1 shows the bidirectional communication circuit 105 as being coupled between the two transceivers 103 and 104. The detailed connections to and from each transceiver 103, 104 and the bidirectional communication circuit 105, the circuit-level implementation of the bidirectional communication circuit 105 and the connections within the bidirectional communication circuit, are not shown in FIG. 1. However, these details will be explained later in the description.

The idle state detection circuit 106 comprises circuit 107 configured to generate a signal indicative of an idle state of the first network 101 and circuit 108 configured to generate a signal indicative of an idle state of the second network 102. The idle state is defined as the state in which a network is not active, that is, the network is not transmitting or receiving any data. Details of an example implementation of the idle state detection circuit will be explained later in this description, using FIGS. 6a and 6b.

The data flow control circuit 109 is configured to take as inputs the signals generated by the idle state detection circuit 106, indicative of the idle state of each network, and generate based on these signals, control signals for controlling the transmitters in the transceivers 103, 104 of the respective networks 101, 102.

One of the key issues that needs to be addressed when designing a data flow control circuit 109 is the avoidance of bus contention during communication between the networks. Bus contention occurs when the bus, or the shared channel for data transmission between the two networks, is being driven by the respective transmitters of the two networks at the same time. Bus contention is undesirable as it results in data corruption and incorrect operation of the bidirectional communication circuit.

Figure 2B:
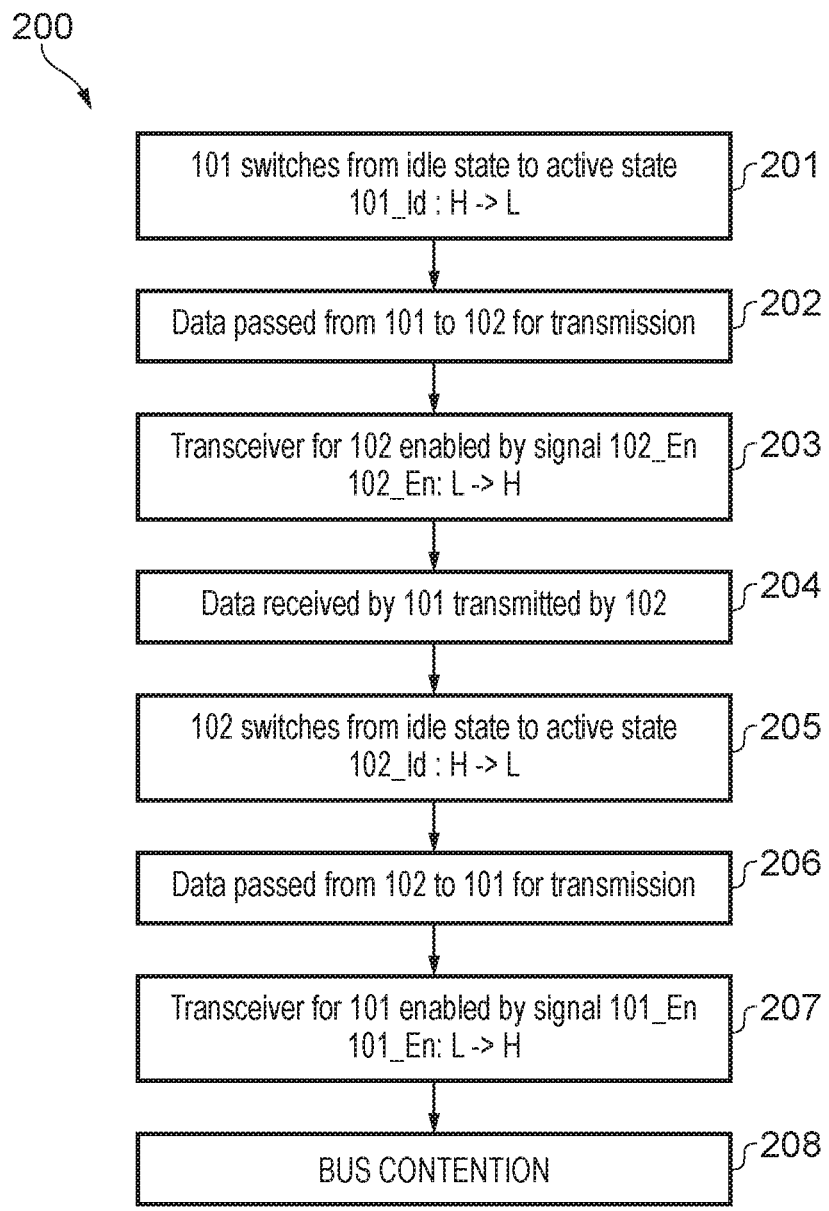
FIG. 2b shows a flow chart of the method of operation 200 of the example data flow control circuit 109.

The issue of bus contention will now be explained in detail using the data flow control circuit 109 as shown in FIG. 2a and the corresponding flow chart in FIG. 2b.

FIG. 2a shows a simplified block diagram of a data flow control circuit 109. As seen in FIG. 2a, the data flow control circuit 109 is configured to receive as inputs, a first signal 101_Id, generated by idle state detection circuit 107, indicative of an idle state of the first network 101 and a second signal 102_Id, generated by idle state detection circuit 108, indicative of an idle state of the second network 102. The data flow control circuit 109 is further configured to output a first signal 101_En for controlling a primary transmitter of a transceiver 103 corresponding to the first network 101 and a second signal 102_En for controlling a primary transmitter of a second transceiver 104 corresponding to the second network 102. As can be seen from FIG. 2a, the output signals 101_En and 102_En are the inverse of the input signals, 102_Id and 101_Id.

FIG. 2b shows a flow chart of the example data flow control circuit 109 during operation. In step 201, the first network 101 goes from an idle state to an active state—this may happen, for example, when the first network 101 is receiving data. In this case, the logic signal 101_Id accordingly goes from high to low, thereby indicating that the first network has transitioned from an idle state to an active state. In step 202, data from the first network 101 is passed on to the second network 102 for transmission onto the second network 102. In this case, the transceiver 104 for the second network 102, in particular, the primary transmitter (not shown) of the transceiver 104 for the second network 102 needs to be enabled for transmission of data onto the second network 102. That is, as seen in step 203, signal 102_En, which controls the primary transmitter of the transceiver 104 of the second network 102, goes from low to high as this signal is the inverse of signal 101_Id. In step 204, data received by the first network 101 is now transmitted onto the second network 102. In step 205, the second network 102 goes from an idle state to an active state—this may happen, for example, when the second network 102 is receiving data. In this case, the logic signal 102_Id accordingly goes from high to low, thereby indicating that the second network 102 has transitioned from an idle state to an active state. In step 206, data from the second network 102 is passed on to the first network 101 for transmission onto the first network 101. In this case, the transceiver 103 for the first network 101, in particular, the primary transmitter (now shown) of the transceiver 103 for the first network 101 needs to be enabled for transmission of data onto the first network 101. That is, as seen in step 207, signal 101_En, which controls the primary transmitter of the transceiver 103 of the first network 101, goes from low to high as this signal is the inverse of signal 102_Id. However, at this point, bus contention occurs as there is a simultaneous transmission of data from network 101 onto network 102 and from network 102 onto network 101.

Figure 3A:
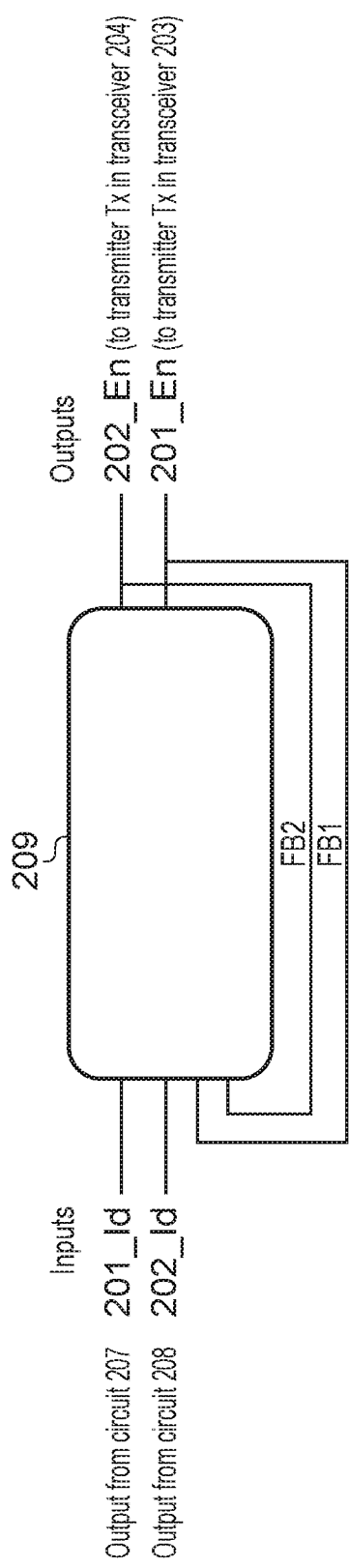
FIG. 3a shows a simplified diagram of a data flow control circuit 209, according to an embodiment of this disclosure.

The present invention provides a solution to this problem of bus contention by providing a modified data flow control circuit 209 as seen in FIG. 3a.

Figure 3B:
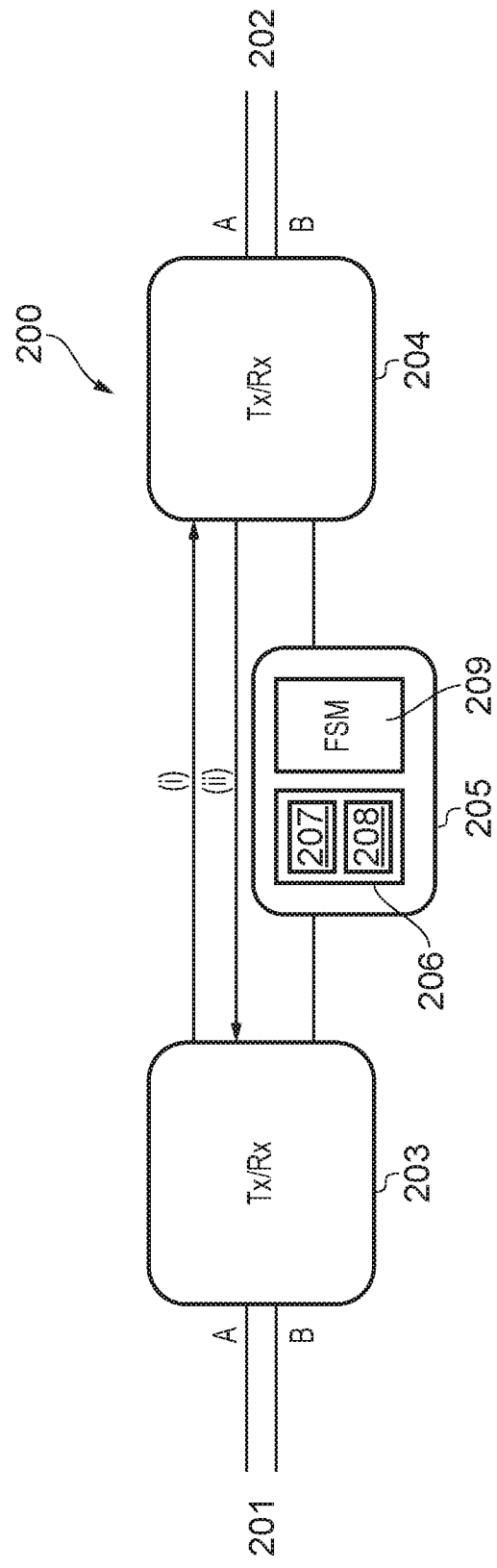
FIG. 3b shows a block diagram of a bidirectional communication system 200, according to an embodiment of this disclosure.

The data flow control circuit 209 of the present invention can be implemented as part of a bidirectional communication circuit 205 for a bidirectional communication system 200, as shown in FIG. 3b. Each of the units of the bidirectional communication system 200 is similar to that of the bidirectional communication system in FIG. 1 except for the bidirectional communication circuit 205 which has been modified to incorporate a data flow control circuit 209 comprising a finite state machine (FSM) 209 having a feedback.

Details of the data flow control circuit 209, according to an embodiment of this disclosure, will now be discussed with reference to FIGS. 3a, 3b and 3c.

FIG. 3a shows a block diagram of the proposed data flow control circuit 209, according to an embodiment of this disclosure. For ease of explanation, the schematic in FIG. 3a is shown with the input stage, having input signals 201_Id, 202_Id, on one side and the output stage, having output signals 201_En, 202_En, on the other side of the FSM. Signals 201_Id, 202_Id are signals generated by the idle state detection circuit 206, in particular by circuits 207 and 208 respectively (c.f. FIG. 3b), and are indicative of the idle state of the respective networks 201 and 202 (c.f. FIG. 3b). Signals 201_En and 202_En are control signals for controlling the primary transmitters of the respective transceivers 203, 204, corresponding to networks 201 and 202, respectively (c.f. FIG. 3b).

As seen in FIG. 3a, the data flow control circuit 209 is configured to be an asynchronous FSM. That is, it is configured to be an FSM which operates without requiring a clock. The FSM is configured to have at least two outputs 201_En and 202_En for controlling the primary transmitters (not shown) in the respective transceivers 203, 204 of the first network 201 and second network 202. The FSM is further configured to have at least four inputs: 201_Id, 202_Id, FB1 and FB2. 201_Id and 202_Id are signals indicative of the idle state of the first network 201 and second network 202, respectively. The other two signals FB1 and FB2 are the feedback signals indicative of a present or current state of the outputs 201_En and 202_En. It can be seen from FIG. 3a that the FSM 209 is configured to generate the next state of the control signals 201_En and 202_En, for the primary transmitters in the respective transceivers 203, 204, based on: (i) signals 201_Id, 202_Id indicative of the idle state of the respective networks 201, 202, and (ii) signals FB1 and FB2 indicative of the present or current transmission state of the respective networks 201, 202.

A more detailed explanation of how each of the control signals, 201_En and 202_En, is generated will be provided below with reference to a detailed circuit-level schematic of FSM 209 with reference to FIG. 3c.

Figure 3C:
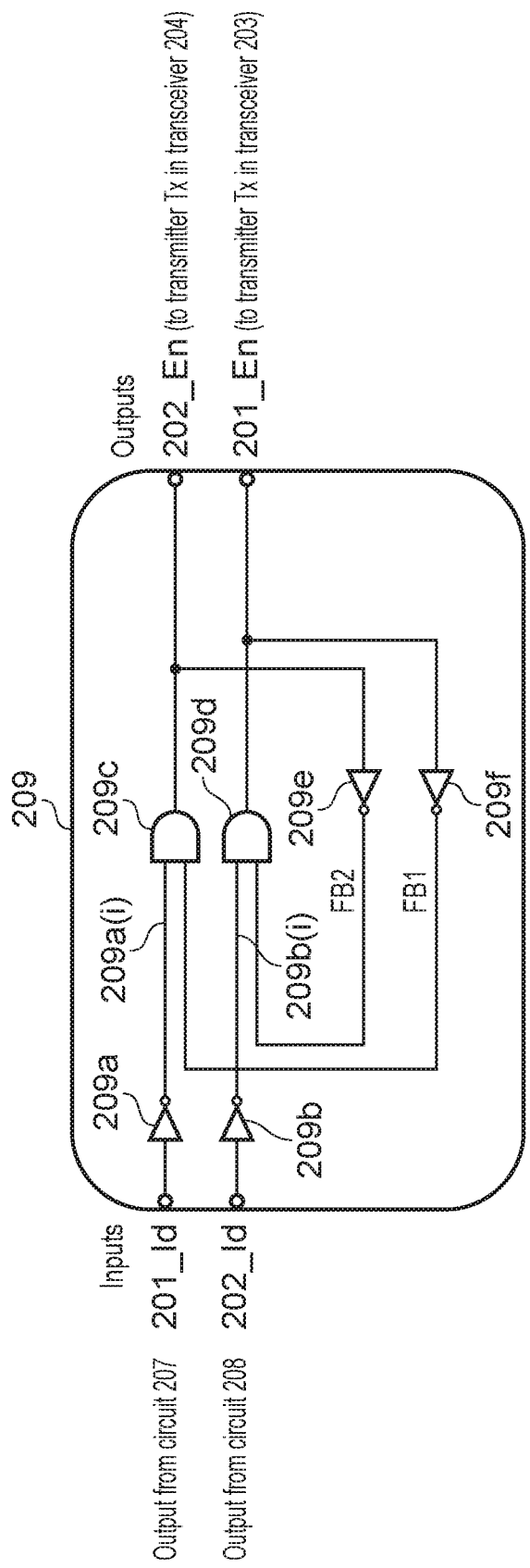

FIG. 3c shows an example circuit-level schematic of the proposed FMS 209 of FIG. 3a, according to an embodiment of this disclosure. As in FIG. 3a, for ease of explanation, the circuit level schematic in FIG. 3c is shown with the input stage, having input signals 201_Id, 202_Id, on one side and the output stage, having output signals 201_En, 202_En, on the other side of the FSM.

In FIG. 3c, the FSM 209 comprises a first inverter logic gate 209a configured to receive and invert the logic state of the input signal 201_Id, where 201_Id, as explained above, is indicative of the idle state of the first network 201. The output of the inverter logic gate 209a is fed as a first input 209a(i) into an AND logic gate 209c. The AND logic gate 209c is configured to compare, that is perform the logical AND operation, on signals 209a(i) and FB1, where FB1 is the first feedback signal which, in this case, is the inverted logic signal of the present or current output signal 201_En. In FIG. 3c, the inversion of the present or current output signal 201_En is performed by logic gate 209f. As explained above, signal 201_En is indicative of whether the transmitter in the primary transceiver 203 of the first network 201 is in an enabled state, that is, signal 201_En is indicative of whether the first network 201 is currently transmitting data. The resultant output of the AND gate 209c sets the next logic state of the control signal, 202_En, to control the primary transmitter in the transceiver 204 of the second network 202.

FSM 209 further comprises a second inverter logic gate 209b configured to receive the input signal 202_Id, where 202_Id, as explained above, is indicative of the idle state of the second network 202. The output of the logic gate 209b is fed as a first input 209b(i) into an AND logic gate 209d. The AND logic gate 209d is configured to compare, that is perform the logical AND operation, on signals 209b(i) and FB2, where FB2 is the second feedback signal which, in this case, is the inverted logic signal of the present or current output signal 202_En. In FIG. 3c, the inversion of the present or current output signal 202_En is performed by logic gate 209e. As explained above, signal 202_En is indicative of whether the transmitter 204 of the second network 202 is in an enabled state, that is, signal 202_En is indicative of whether the second network 202 is currently transmitting data. The resultant output of the AND gate 209d sets the next logic state of the control signals, 201_En, for the primary transmitter in the transceivers 203 of the first network 201.

Figure 4:
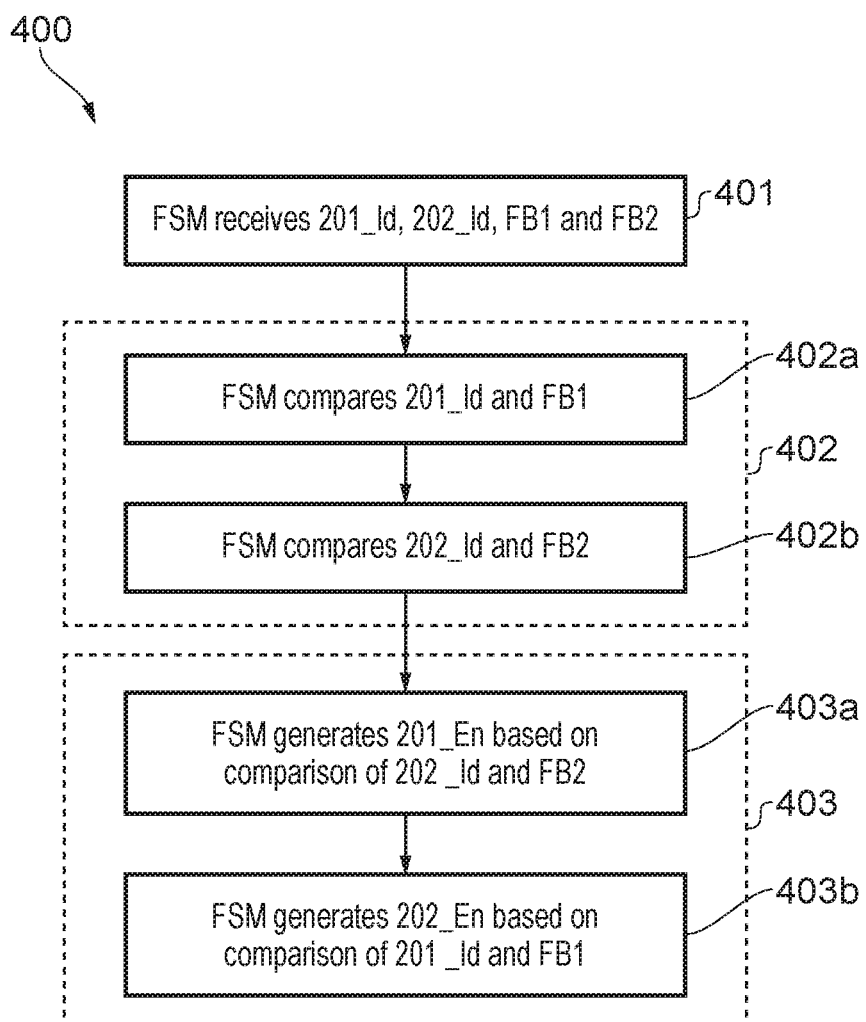
FIG. 4 shows a flow chart of the method of operation 400 of the data flow control unit 209 of FIGS. 3a, 3c.

FIG. 4 shows a flow chart representing a method of operation 400 of the FSM 209 of FIGS. 3a, 3c, according to an embodiment of this disclosure. In step 401, the FSM 209 receives a first signal 201_Id indicative of the idle state of the first network 201, a second signal 202_Id indicative of the idle state of the second network 202, a first feedback signal FB1 indicative of the present or current transmission state of the first network 201 and a second feedback signal FB2 indicative of the present or current transmission state of the second network 202. In step 402a, FSM 209 is configured to compare, for example, using a first logic AND gate 209c the first signal 209a(i) indicative of the idle state of the first network 201 and the first feedback signal FB1 indicative of the present or current transmission state of the first network 201. In step 402b, FSM 209 is configured to compare, for example, using second logic AND gate 209d the second signal 209b(i) indicative of the idle state of the second network 202 and the second feedback signal FB2 indicative of the present or current transmission state of the second network 202. In step 403a, FSM 209 generates a first control signal 201_En for controlling the primary transmitter in the transceiver of the first network 201. Control signal 201_En is generated based on a comparison of signal 202_Id indicative of the idle state of the second network 202 and the second feedback signal FB2 indicative of the present or current transmission state of the second network 202. In step 403b, FSM 209 generates a second control signal 202_En for controlling the primary transmitter in the transceiver 204 of the second network 202. Control signal 202_En is generated based on a comparison of signal 201_Id indicative of the idle state of the first network 201 and the first feedback signal FB1 indicative of the present or current transmission state of the first network 201.

By way of the implementation in FIGS. 3a, 3c and the corresponding method of operation 400, the proposed data flow control circuit or FSM 209 is configured to avoid bus contention. That is, the inventors have designed FSM 209 to avoid simultaneous transmission of data from network 201 to network 202 and from network 202 to network 201, by comparing signals indicative of the idle state of each network with the respective signals indicative of the present or current transmission state of each network. The inventors have recognised that, in order to avoid bus contention, the data flow control circuit or FSM 209 should be configured to generate control signals for the transmitters of the respective networks based on the current state of the networks— that is, whether the networks are idle or active—and based on whether the respective transceivers 203, 204 of the networks 201, 202 are currently transmitting.

However, the inventors also recognised that a practical implementation of the proposed FSM 209 in a bidirectional communication system 200 (see FIG. 3b), results in timing hazards in the form of a glitches in the detected logic levels, particularly when a concerned network is operating at a high speed (for example 50 Mbps or higher) and is switching to and from an idle state.

FIG. 5a(i) shows an example of a first timing issue observed when a high speed network is switching to an idle state from a transmission state. For example, as seen in FIG. 5a(i), the feedback signal FB2 (output of inverter 209e in 3c) transitions from a logic low level to a logic high level indicating that the corresponding network is no longer transmitting, i.e. it is idle. However, a glitch occurs in this feedback signal as shown in FIG. 5a(i) and the inventors have recognised that this is because the feedback signal is transitioning too fast. The inventors have realised that the design of the FSM 209 has to be further modified to address this issue by including a delay in each of the feedback signals FB1, FB2 to the FSM. The delay may be incorporated by including a respective RC filter 209g, 209h in each path of the feedback signals, FB1 and FB2, as shown in FIG. 5a(ii). The RC filters, for example RC filter 209g comprises a resistor 209g(i) and a capacitor 209g(ii) coupled in series with the resistor 209g(i).

However, the inventors further recognised, upon evaluating the modified circuit in FIG. 5a(ii), that despite the addition of the delay circuit to each of the feedback path, a timing issue occurs when a high speed network is switching to a transmission state from an idle state causing the network to be enabled incorrectly. That is, the inventors have recognised that a race condition exists between the idle detection circuitry and the FSM feedback circuitry when a high speed network is switching to a transmission state from an idle state.

FIG. 5b(i) shows an example of such a timing issue. As seen in FIG. 5b(i), due to the delayed enabling of the network 202 (see signal trace 202_En) there is a glitch in the initial transmission of the data signals A and B. When a network, for example, network 202, switches to a transmission state, the feedback signal FB2 (output of inverter 209e in 3c) transitions from a logic high level to a logic low level thereby indicating that the concerned network has switched to a transmission state from an idle state. In this case, the inventors have recognised that the feedback signal with the delay (for example, as a result of incorporating the RC filter 209g, 209h as shown in FIG. 5a(ii)) is too slow resulting in a timing issue occurring as shown in FIG. 5b(i). In order to address this type of timing issue, the inventors recognised that the delay in feedback signals FB1, FB2, as implemented, for example, by the RC filters 209g, 209h, is only required when the respective network is switching from a transmitting state to an idle state. For the case when the network is switching from an idle state to a transmitting state, the delay in feedback signal is not required. That is, the inventors have realised that the delay in the feedback signals FB1, FB2 should be implemented as an asymmetric delay. Such an asymmetric delay in the feedback signals FB1, FB2 may be realised by modifying the RC filters 209g, 209h in the feedback paths of the respective feedback signals FB1, FB2 as shown in FIG. 5b(ii), which is an embodiment of this disclosure. As seen in FIG. 5b(ii), each RC filter 209g, 209h may be modified for implementing an asymmetric delay by including a Schottky diode 209g(iii), 209h(iii) coupled in parallel to the RC filter 209g, 209h, wherein the diode 209g(iii), 209h(iii) is configured to bypass the resistor 209g(i), 209h(i) in the respective RC filters 209g, 209h, in a first direction.

Therefore, the circuit level implementation of the data flow control circuit 209 in FIG. 5b(ii) is optimised to avoid the impact of glitches or timing hazards when the circuit is used as part of a bidirectional communication circuit 205 in a bidirectional communication system 200 (c.f. FIG. 3b).

The detailed circuit level implementation of the bidirectional communication circuit 205 will now be discussed with reference to circuit-level implementations of the idle state detection circuit 206 and the optimised data flow control circuit 209

Figure 6A:
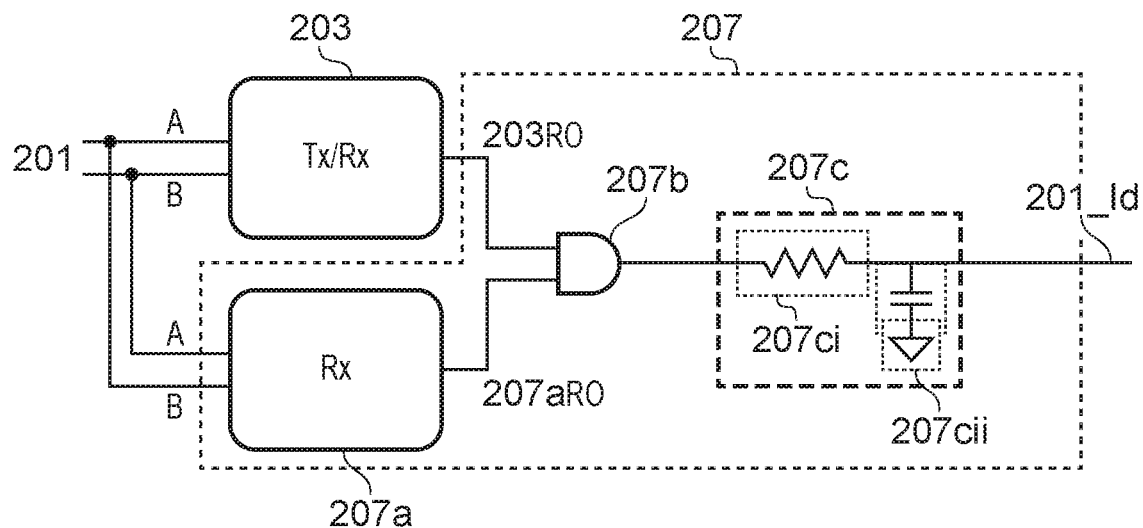
FIGS. 6a and 6b show example implementations of the idle state detection unit 206 of the bidirectional communication circuit 205 of FIG. 3b.
Figure 6B:
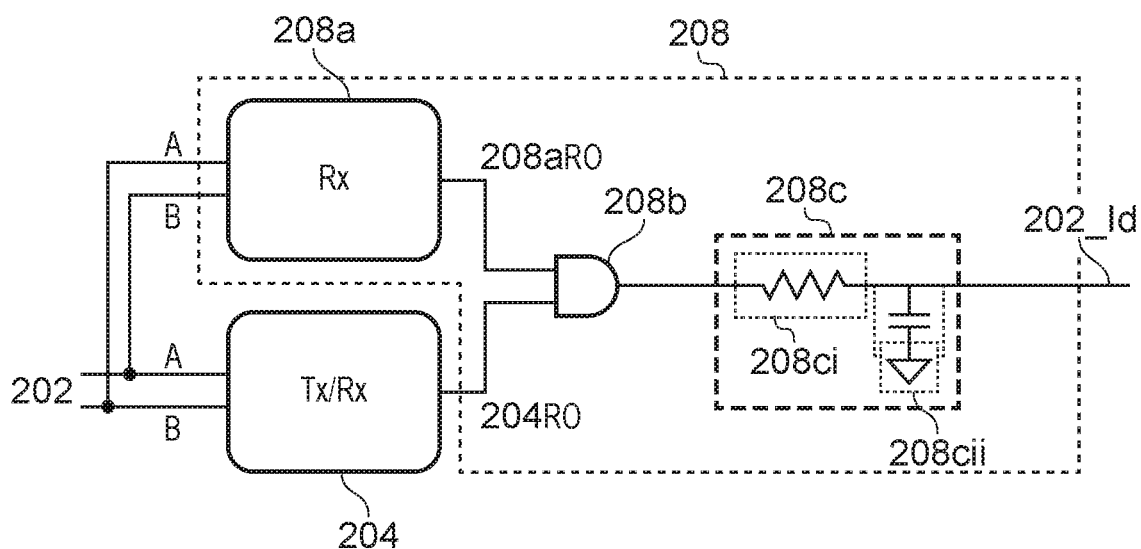

FIG. 6 shows an example representation of the circuit level schematic of the idle state detection circuit 206, of the bidirectional communication circuit 205 of FIG. 3b, comprising circuits 207 (FIG. 6a) and 208 (FIG. 6b).

As seen in FIG. 6a, the circuit 207, for detecting the idle state of network 201, comprises an additional receiver 207a and a logic gate 207b. The circuit 208 has the same configuration as circuit 207, except that circuit 208 is configured to detect the idle state of network 202. Hence, the explanation below for the configuration of circuit 207 as given below is also applicable for circuit 208 shown in FIG. 6b.

The receiver 207a is compatible for use with the communication standard of network 201. For example if transceiver 203 is a RS-485 transceiver then receiver 207a is also a RS-485 receiver. The differential input (A,B) of the receiver 207a is inversely coupled to the differential input (A,B) of the transceiver 203. That is, the receiver 207a is coupled with reverse polarity to the primary receiver of the transceiver 203 of the first network 201. As a result of the reversed polarity coupling of the additional receiver 207a to the primary receiver of transceiver 203, any data received by the additional receiver 207a is configured to be the inverse of the data received by the corresponding primary receiver of transceivers 203.

The circuit 207 is further configured to compare the output $203_{RO}$ of the primary receiver (not shown) of the transceiver 203 and the output $207a_{RO}$ of the receiver 207a, for example, by gating the outputs to an AND gate 207b (see FIG. 6a). The detection of the idle state of the network is enabled by comparing the two receiver outputs.

In one example, when the corresponding network 201 is idle, the failsafe output of the respective primary receiver of transceiver 203 and the additional receiver 207a is configured to be equal. In this case, the logic gate 207b which may be, for example an AND gate as shown in FIG. 6a, is used to detect the state when the output $203_{RO}$ of the primary receiver of transceiver 203 and the output $207a_{RO}$ of the additional receiver 207 are equal and generate a "network idle" signal.

If the receiver devices are configured to failsafe to a logical 0, then the logic gate 207b may be an OR logic gate. If the receiver devices are configured to failsafe to a logical 1, then the logic gate 207b may be a NAND gate.

As seen in FIG. 6a, the circuit 207 may additionally comprise a respective filter 207c, which is an RC filter comprising a resistor 207ci and a capacitor 207cii, coupled to its output. The RC filter 207c is configured to prevent any timing glitches that may arise due to timing mismatches and pulse skew in the primary receiver of transceiver 203 and the additional receiver 207a.

Figure 7A:
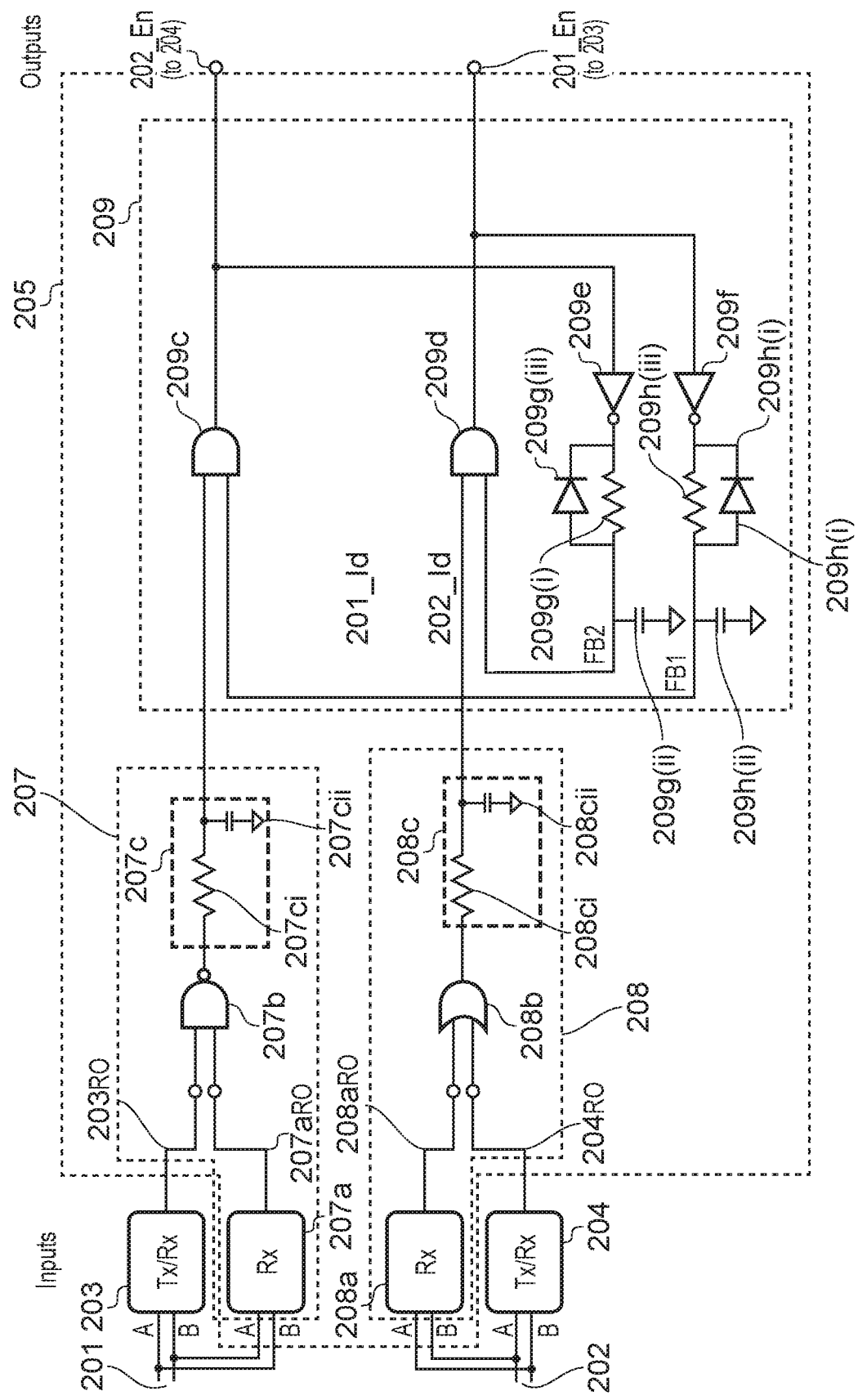
FIG. 7a shows a circuit-level schematic of the bidirectional communication circuit 205, according to an embodiment of this disclosure.

FIG. 7a shows a circuit level schematic of the bidirectional communication circuit 205, according to an embodiment of the present disclosure. The bidirectional communication circuit 205 comprises the idle state detection circuit 206 (refer FIG. 6a, 6b) coupled to the FSM 209 where the FSM 209 is optimised to avoid glitches or timing hazards during operation. For ease of representation, the circuit level schematic 205 is shown with the input stage of the bidirectional communication circuit 205 on one end and the output stage of the bidirectional communication circuit on the other end. The input stage shows the transceivers 203, 204 coupled to the idle state detection circuit 206. The output stage shows two signals 201_En and 202_En for controlling the corresponding primary transmitters of the transceivers 203 and 204 of networks 201 and 202 respectively. In some implementations, the transceivers 203, 204 may also be part of the bidirectional communication circuit 205.

Figure 7B:
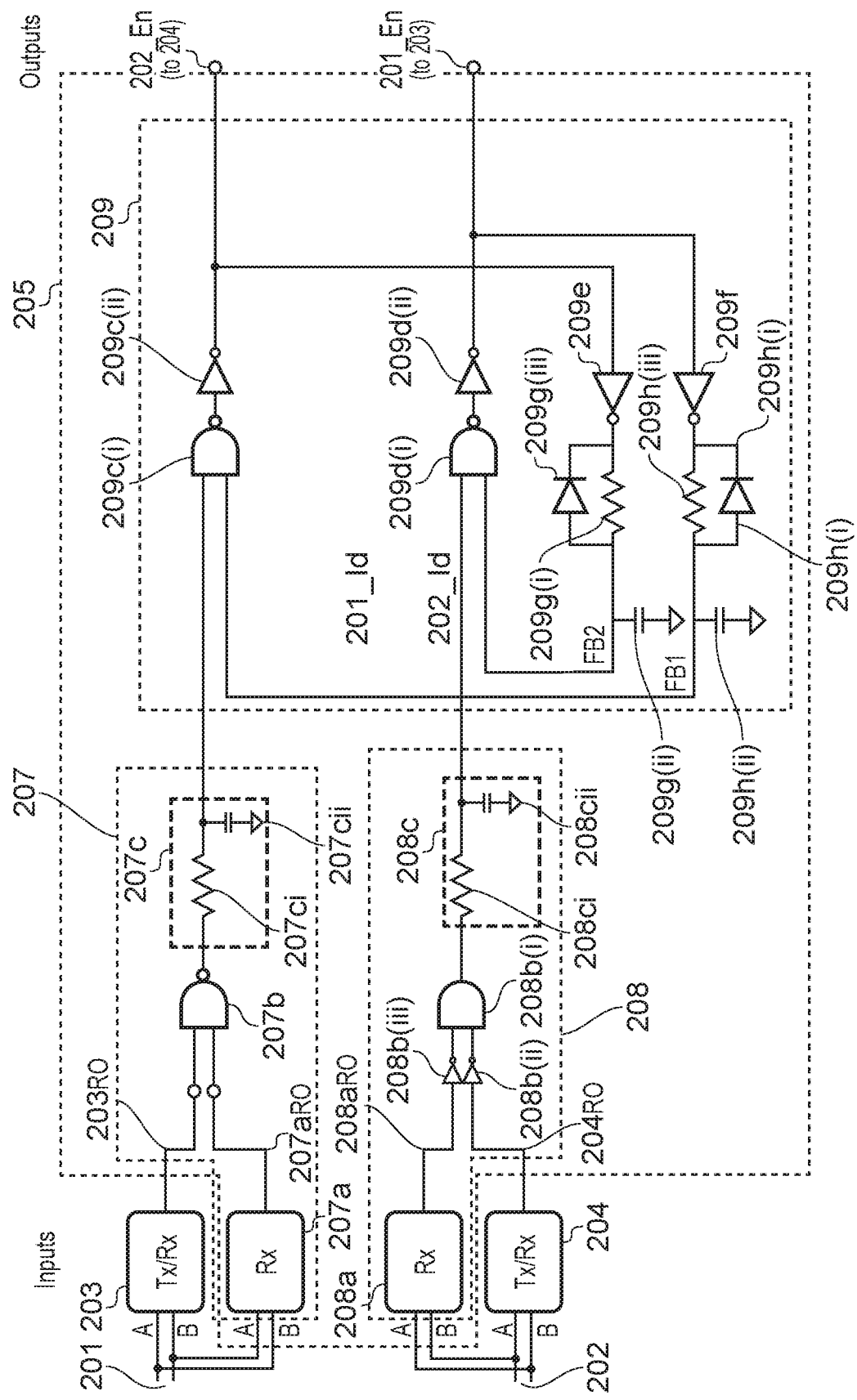
FIG. 7b shows an alternative circuit-level schematic of the bidirectional communication circuit 205, according to another embodiment of this disclosure.

FIG. 7b shows an alternative circuit level schematic of the bidirectional communication circuit 205 according to a further embodiment of the present disclosure. In this case, the OR gate 208b in FIG. 7a is replaced with a NAND 208b(i) and two NOT gates 208b(ii), 208b(iii) Each AND gate in the FSM 209 of FIG. 7a is replaced with a NAND gate and one NOT gate. This alternative implementation has the advantage of reducing the logic from multiple discrete integrated circuits (ICs) (to account for the different types of logic gates in FIG. 7a) to just two discrete integrated circuits (FIG. 7b)—that is, this particular implementation of the bidirectional communication circuit only requires one quad two-input NAND IC and one six-input inverter.

Figure 8B:
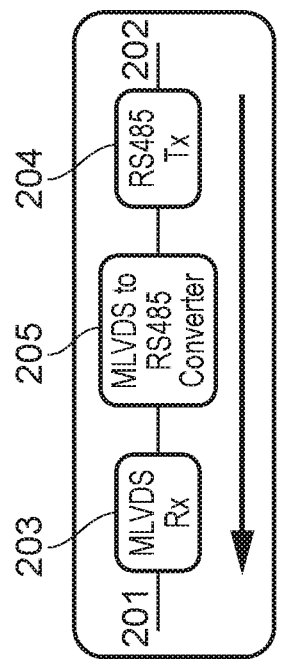
FIGS. 8a(i)-8a(iii) and 8b(i)-8b(iii) show example signal traces observed during implementation of the bidirectional communication circuit of this disclosure as a converter in a bidirectional communication system.
Figure 8B:
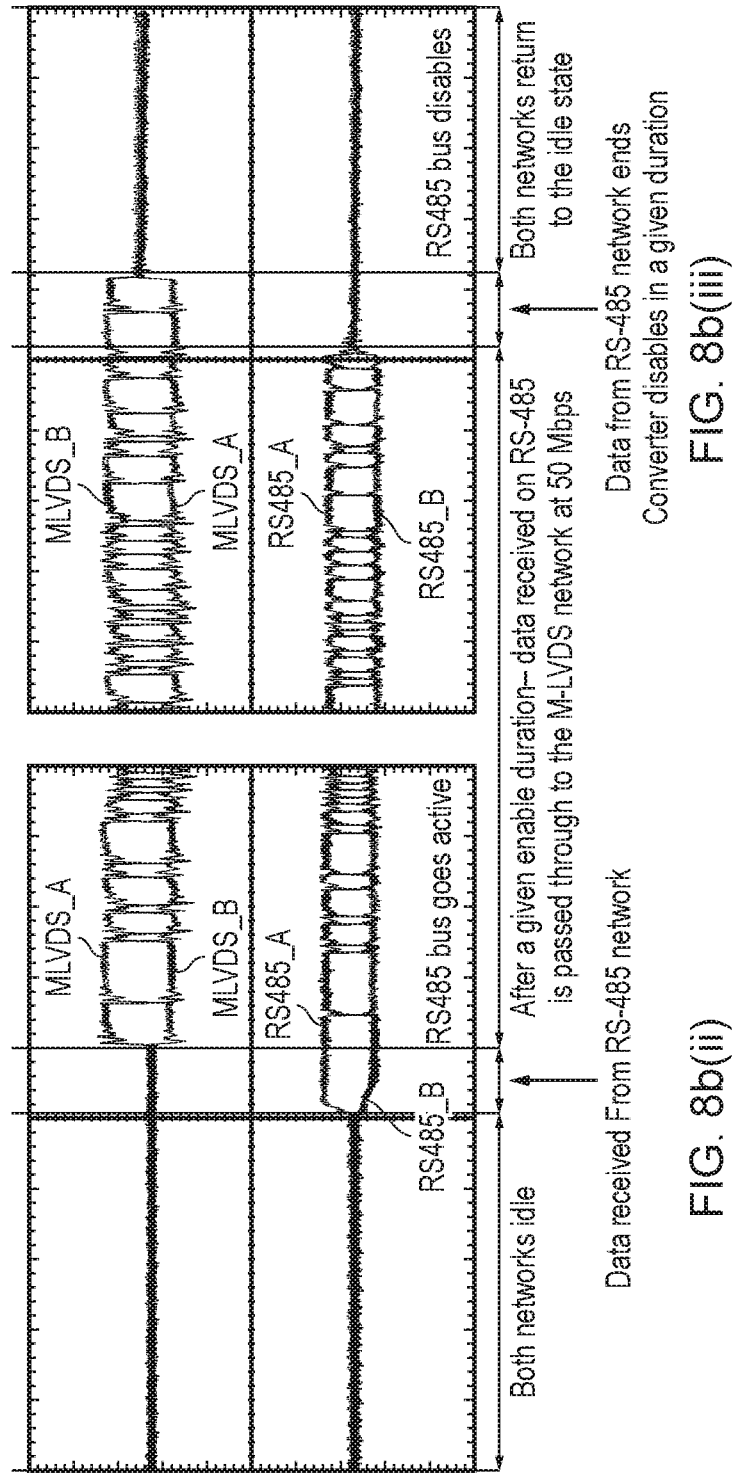

FIG. 8a, 8b show the evaluation signal traces of the proposed bidirectional communication circuit 205 when used as a converter between a RS-485 network 202 and an M-LVDS network 201. As seen in FIG. 8a(i) bidirectional communication circuit 205 enables the transceiver 203 to receive the M-LVDS data from the M-LVDS network 201 and transmit the received data onto the RS-485 network via transmitter 204. FIG. 8a(ii) shows the M-LVDS network 201 switching to an active state for transmission of data and FIG. 8a(iii) shows the M-LVDS network 201 switching to an idle state after transmission of data is complete. Similarly, in FIG. 8b(i) the bidirectional communication circuit 205 enables transceiver 204 to receive RS-485 data from the RS-485 network 202 and transmit the received data onto the M-LVDS network 201 via the transceiver 203. FIG. 8b(ii) shows the RS-485 network 202 switching to an active state for transmission of data and FIG. 8b(iii) shows the RS-485 network 202 switching to an idle state after transmission of data is complete. The evaluation of the bidirectional communication circuit 205 as seen in FIGS. 8a and 8b shows that, the bidirectional communication circuit 205, of the present invention, can be used as a converter between networks operating under different communication standards. FIGS. 8a and 8b also show that the proposed bidirectional communication circuit 205 avoids the occurrence of timing hazards in addition to avoiding the issue of bus contention.

While the example in FIGS. 8a, 8b shows the signal traces for the proposed bidirectional communication circuit 205 when implemented as a converter, the bidirectional communication circuit 205 may also be implemented in other embodiments as a repeater. That is, the proposed circuit 205 may be used between two differential wired communication networks operating under the same communication standard and at substantially the same data as defined by the communication standard. An example application is the use of the bidirectional communication circuit as an isolated auxiliary channel repeater for a digital display interface, for example for DisplayPort.

Figure 9A:
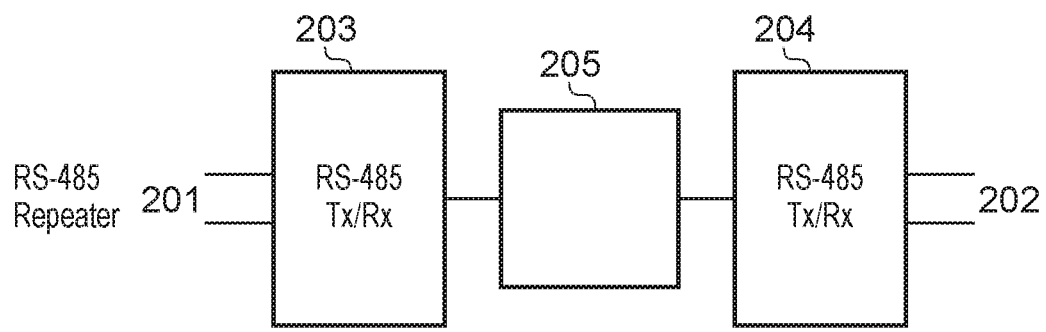
FIGS. 9a and 9b show example implementations of the bidirectional communication circuit as a repeater, according to further embodiments of this disclosure.
Figure 9B:
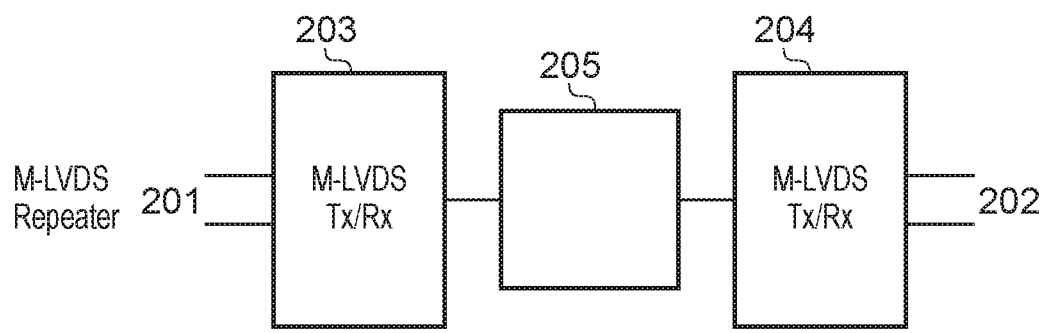

FIGS. 9a and 9b show two further embodiments of this disclosure where the proposed bidirectional communication circuit 205 may be used as a repeater between two RS-485 networks 201, 202 (FIG. 9a) or two M-LVDS networks 201, 202 (FIG. 9b).

Figure 10A:
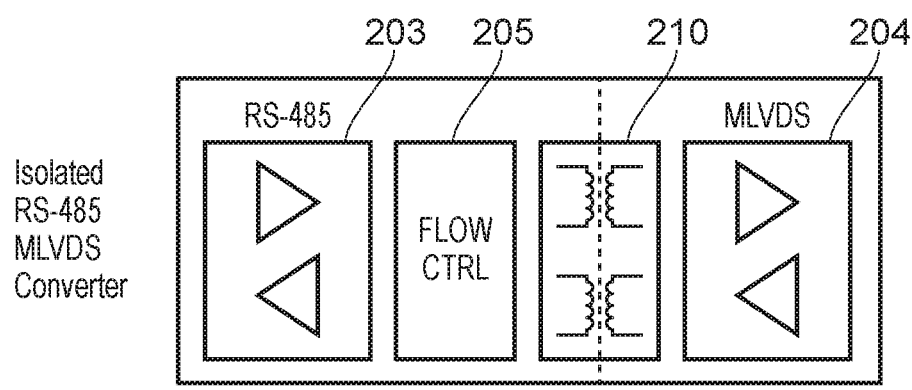
FIGS. 10a and 10b show example implementations of the bidirectional communication circuit as a converter and repeater, respectively, where the bidirectional communication circuit further comprises means for galvanic isolation of the networks in bidirectional communication with each other, according to further embodiments of this disclosure.
Figure 10B:
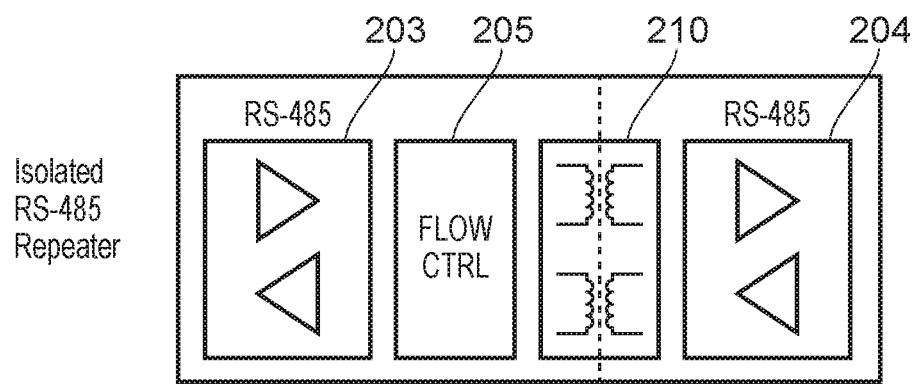

FIGS. 10a and 10b are further embodiments of this disclosure where galvanic digital isolation 210 is incorporated together with the bidirectional communication circuit 205 between a first differential wired communication network 201 and second differential wired communication network 202, where the two networks are in bidirectional communication with each other. The flexibility of the proposed design of the bidirectional communication circuit allows for the design to be configured to incorporate galvanic digital isolation 210 between the two networks 201 and 202. For example, in the proposed design of FIGS. 7a, 7b, the value of the resistors, 209g(i), 209h(i), and the value of the capacitors, 209g(ii), 209h(ii), can be adapted to account for any additional propagation delay caused by the introduction of an isolator component into the circuit design. Incorporation of galvanic isolators, such as Analog Devices iCoupler® and isoPower®, results in improved integrity of the communication between the networks as the isolators prevent the occurrence of ground loops and improve the noise immunity of the networks in communication with each other.

Although the transceivers 203, 204 in every embodiment of the proposed bidirectional communication circuit 205 are shown to be separate units to the circuit 205, in other embodiments, the bidirectional communication circuit 205 may also comprise the transceivers 203 and 204 as part of the circuit. The use of the term 'coupled' throughout the description, particularly in relation to the embodiments describing the bidirectional communication circuit, is to be interpreted to mean a direct or indirect connection between units or components in the bidirectional communication circuit. For example, two units being described as coupled to each other can mean that they are directly connected by a conductor or indirectly connected via another component or unit in between the two units.

Although this invention has been described in terms of certain embodiments, the embodiments can be combined to provide further embodiments. In addition, certain features shown in the context of one embodiment can be incorporated into other embodiments as well.

The invention claimed is:

1. A bidirectional communication circuit for bidirectional communication between a first differential wired communication network and a second differential wired communication network, the bidirectional communication circuit comprising:
   a transceiver unit configured to receive and transmit data to and from each said network;
   an idle state detection unit configured to determine an idle state of each said network; and
   a data flow control unit coupled to the transceiver unit and to the idle state detection unit, and configured to control a direction of communication flow between the first network and the second network; wherein
   the data flow control unit comprises an asynchronous finite state machine having feedback; and
   the data flow control unit is further configured to prevent data being simultaneously transmitted from the first network to the second network and from the second network to the first network.

2. A bidirectional communication circuit according to claim 1 wherein the transceiver unit comprises a first transceiver circuit for the first network and a second transceiver circuit for the second network.

3. A bidirectional communication circuit according to claim 2 wherein the finite state machine has a first output signal and a second output signal, for controlling a first transmitter in the first transceiver circuit and a second transmitter in the second transceiver circuit, respectively, wherein the said feedback comprises the first output signal and the second output signal.

4. A bidirectional communication circuit according to any of claim 2 wherein the idle state detection unit comprises:
   a first receiver coupled with reverse polarity to the receiver of the first transceiver circuit of the transceiver unit;

a second receiver coupled with reverse polarity to the receiver of the second transceiver circuit of the transceiver unit, and wherein the idle state detection unit is configured to compare the output of first receiver of the idle state detection unit and the output of the receiver of the first transceiver circuit of the transceiver unit to determine if the first network is in an idle state, and wherein the idle state detection unit is further configured to compare the output of the second receiver of the idle state detection unit with the output of the receiver of the second transceiver circuit of the transceiver unit to determine if the second network is in an idle state.

5. A bidirectional communication circuit according to claim 1 wherein the finite state machine is configured to receive, from the idle state detection unit, a first input signal and a second input signal, wherein the first input signal is indicative of the idle state of the first network and wherein the second input signal is indicative of the idle state of the second network.

6. A bidirectional communication circuit according to claim 1 wherein the said feedback comprises a delay unit for implementing a delay in the feedback to the finite state machine when at least one of the networks changes from a transmitting state to an idle state.

7. A bidirectional communication circuit according to claim 6 wherein the delay unit comprises an Resistor-Capacitor (RC) filter and a Schottky diode coupled in parallel to the RC filter, wherein the diode is configured to bypass the resistor in the RC filter in a first direction.

8. A bidirectional communication circuit according to claim 1 wherein the first network is configured according to a different communication standard to the second network.

9. A bidirectional communication circuit according to claim 8 wherein the first network is configured according to a Multipoint Low Voltage Differential Signaling (M-LVDS) communication standard and the second network is configured according to Recommended Standard RS-485 communication standard.

10. A bidirectional communication circuit according to claim 8 wherein the bidirectional communication circuit is configured to function as a converter between the first network and the second network.

11. A bidirectional communication circuit according to claim 1 wherein the first network is configured according to a same communication standard as the second network.

12. A bidirectional communication circuit according to claim 11 wherein the bidirectional communication circuit is configured to function as a repeater between the first network and the second network.

13. A bidirectional communication circuit according to claim 12 wherein the bidirectional communication circuit is configured to function as an isolated auxiliary channel repeater for a digital display interface.

14. A bidirectional communication circuit according to claim 1 further comprising a Resistor-Capacitor (RC) filter coupled to the output of the idle state detection unit.

15. A bidirectional communication circuit according to claim 1 further comprising a means for galvanic isolation between the first network and the second network.

16. A bidirectional communication system comprising:
a first differential wired network;
a second differential wired network;
a bidirectional communication circuit according to claim 1, wherein the first differential wired network is coupled to the second differential wired network via the said bidirectional communication circuit.

17. A bidirectional communication system according to claim 16 wherein the bidirectional communication system comprises:
a motor control system for controlling a motor, wherein the first differential wired network comprises a motor driver for controlling, using bidirectional communication, a plurality of devices of the motor control system; and
wherein the second differential wired network comprises a position encoder for monitoring a shaft position of the motor.

18. A bidirectional communication circuit for bidirectional transmission of data in a multipoint differential wired communication system, wherein the bidirectional communication circuit is configured to prevent bus contention between networks in a bidirectional communication, in the multipoint differential wired communication system, the bidirectional communication circuit comprising:
a transceiver unit configured to receive and transmit data to and from each network;
an idle state detection unit configured to determine an idle state of each network; and
a data flow control unit coupled to the transceiver unit and to the idle state detection unit, and configured to control a direction of communication flow between the first network and the second network; wherein
the data flow control unit comprises an asynchronous finite state machine having feedback; and
the data flow control unit is further configured to prevent data being simultaneously transmitted from the first network to the second network and from the second network to the first network.

19. A method for controlling bidirectional communication between a first differential wired communication network and a second differential wired communication network, the method comprising:
receiving a first signal indicative of an idle state of the first network and a second signal indicative of an idle state of the second network;
receiving a first feedback signal indicative of a current transmission state of the first network and a second feedback signal indicative of a current transmission state of the second network;
comparing the first signal indicative of the idle state of the first network and the first feedback signal indicative of the current transmission state of the first network;
comparing the second signal indicative of the idle state of the second network and the second feedback signal indicative of the current transmission state of the second network;
generating a first control signal for controlling the next transmission state of the first network based on the said comparison of the second signal indicative of the idle state of the second network and the second feedback signal indicative of the current transmission state of the second network; and
generating a second control signal for controlling the next transmission state of the second network based on the said comparison of the first signal indicative of the idle state of the first network and the first feedback signal indicative of the current transmission state of the first network.

20. A method for controlling bidirectional communication according to claim 19, wherein the method further comprises:
(i) if the first feedback signal indicates a transition from a transmission state to an idle state for the first network, delaying the first feedback signal indicative of the current transmission state of the first network before said comparison of the first signal with the first feedback signal;
(ii) if the second feedback signal indicates a transition from a transmission state to an idle state for the second network, delaying the second feedback signal indicative of the current transmission state of the second network before said comparison of the second signal with the second feedback signal.

* * * * *